Sept. 25, 1945.    F. P. BAUM    2,385,396
INDEXING UNIT
Filed May 29, 1944    2 Sheets-Sheet 2
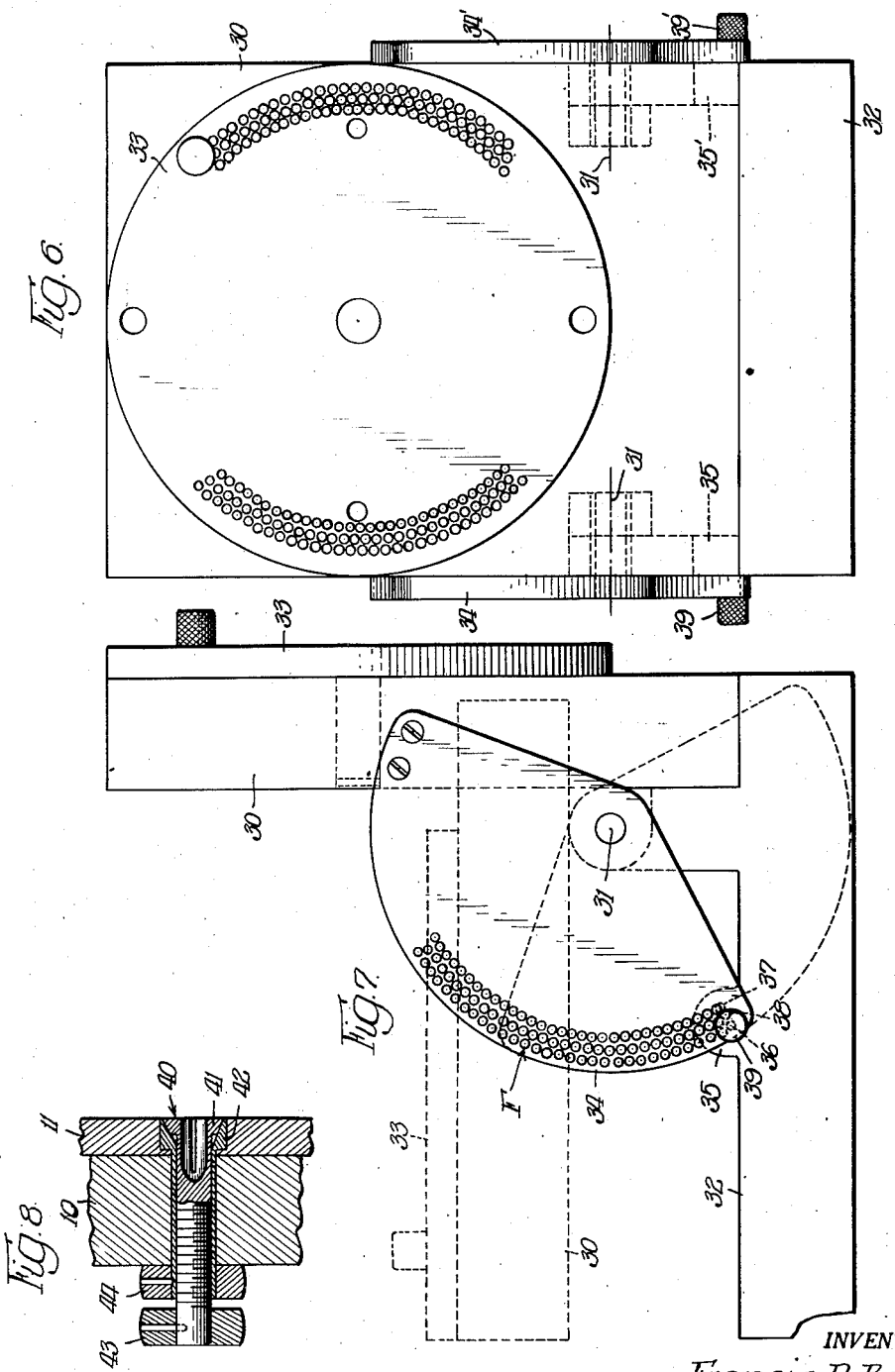
INVENTOR.
Francis P. Baum,
BY Patented Sept. 25, 1945

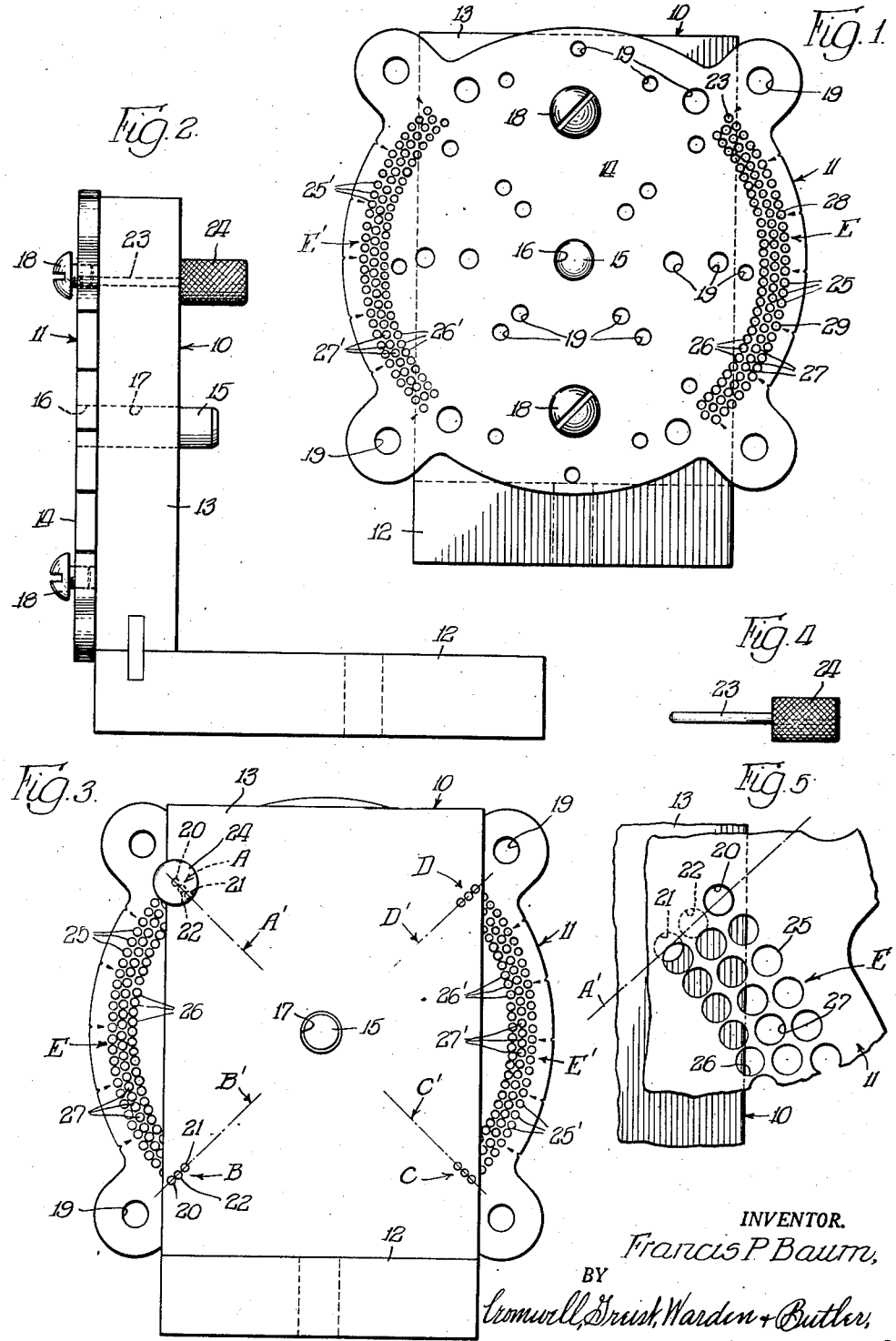

2,385,396

UNITED STATES PATENT OFFICE 2,385,396

INDEXING UNIT

Francis P. Baum, Chicago, Ill.

Application May 29, 1944, Serial No. 537,887

3 Claims. (Cl. 33—174)

The present invention has to do with a device for use by tool makers and other machinists in accurately laying out lines and shapes of various kinds within extremely close tolerances on pieces of stock.

In the past this sort of work has ordinarily required the employment of special dividing heads and other complicated mechanisms, which have not only been difficult for all but the most experienced operators to use but have been very expensive to manufacture.

The present invention resides in the provision of a simple, inexpensive and easily mastered indexing unit of novel construction with which a large number of widely varied layout problems can be quickly and accurately worked out on pieces of stock, without recourse to the more complicated mechanisms heretofore considered indispensable in tool room and machine shop practice.

While the foregoing statements are indicative in a general way of the nature of the invention, other more specific objects and advantages will be apparent to those skilled in the art upon a full understanding of the construction and manner of use of the new indexing unit.

A preferred embodiment of the invention, and certain illustrative modifications thereof, are presented herein by way of exemplification but it will of course be appreciated that the invention is susceptible of incorporation in still other structurally modified forms coming equally within the scope of the appended claims.

In the accompanying drawings:

Fig. 1 is a front view of an indexing unit constructed in accordance with the invention;

Fig. 2 is a side view of the unit;

Fig. 3 is a rear view of the unit;

Fig. 4 is a side view of the pin used in locking the movable indexing plate in any desired angular position with respect to the stationary angle plate;

Fig. 5 is an enlargement of a small portion of Fig. 1;

Fig. 6 is a face view of another indexing unit constructed in accordance with the invention;

Fig. 7 is a side view of the unit shown in Fig. 6; and

Fig. 8 is a fragmentary section through the center of either of said units, showing the movable indexing plate replaced by a similar plate having a modified bore and the plain journaling stud for the indexing plate replaced by a special work clamping collet.

The indexing unit shown in Figs. 1 to 5, inclusive, will first be described. This unit consists of a stationary angle plate 10 and a movable indexing plate 11. The angle plate 10 is characterized by a horizontal supporting base 12 and by a portion 13 which extends vertically from the base 12 at one end of the latter. The indexing plate 11 is a flat disk-like member which is characterized by a vertically disposed work-supporting face 14.

The indexing plate 11 is connected with the angle plate 10 for rotation about a horizontal axis in the plane of the work-supporting face 14. This connection is effected by a small cylindrical stud 15 which is secured—preferably by press fitting—in a bore 16 in the center of the indexing plate 11 and is journaled in a snugly fitting bore 17 in the vertically extending portion 13 of the angle plate.

The piece of material (not shown) to be worked on is adapted to be fixedly clamped against the work-supporting face 14 of the indexing plate by means of two screws 18 fitted into any two tapped holes 19 in the indexing plate.

The vertically extending portion 13 of the angle plate is provided at A, B, C and D with four groups of small holes, of three holes each. The three holes 20, 21 and 22 in each group are located close together on straight lines A', B', C' and D', which lines extend radially from the axis of the journaling stud 15 and are spaced apart exactly 90°. The holes 20, 21 and 22 in each group will hereinafter be referred to as the "stationary" holes, in order to differentiate them from the hereinafter described holes in the movable indexing plate, which last mentioned holes will hereafter be referred to as the "movable" holes.

A locking pin 23 having a finger piece 24 is adapted to be inserted in any one of the three holes 20, 21 and 22 in any of the four groups A, B, C and D, and projected into any hole in the indexing plate brought into registration with the same.

The indexing plate 11 is provided at E with ninety holes, hereinafter referred to as the "movable" holes, which holes are arranged in three concentric rows of thirty holes each and extend over an arc of 90°. The movable holes 25 in the outer row are separated 3° from each other and are all spaced the same distance from the axis of the stud 15 as the outer stationary holes 20; the movable holes 26 in the inner row are similarly separated 3° from each other and are spaced the same distance from the axis as the inner stationary holes 21, and the movable holes 27 in the intermediate row are likewise separated 3° from each other and spaced the same distance from the axis as the intermediate stationary holes 22. The movable holes in the three concentric rows are also off-set circumferentially with respect to each other—each of the holes 26 in the inner row being angularly spaced 1° from the corresponding hole in the outer row, and each of the holes 27 in the intermediate row being angularly spaced 1° from the corresponding hole in the inner row and consequently 2° from the corresponding hole in the outer row.

This staggered arrangement of the movable holes 25, 26 and 27 throughout an arc of 90°, in combination with the 90° spacing of the four groups of stationary holes 20, 21 and 22, obviously enables the indexing plate 11 to be turned from one locked position to another locked position through any angle, large or small, other than one involving a fraction of a degree.

To enable the indexing plate 11 to be turned from one locked position to another locked position through an angle of any size involving half of a degree, the indexing plate is provided in another sector E' with a second arcuate group of ninety holes, which holes are arranged in three concentric rows like the holes 25, 26 and 27 at E and are spaced apart in the same way, the holes 25', 26' and 27' in the outer, inner and intermediate rows in the group E' being each spaced circumferentially exactly 180½° from the corresponding hole in the group E and being so spaced from the axis of the stud 15 as to be movable into registration with the stationary holes at either A, B, C or D.

If smaller fractions of a degree are desired one or more additional groups of holes may be added between the groups E and E', with the holes in the added groups offset the desired fractions of a degree from the holes in group E.

From the foregoing it will be readily understood that a unit constructed in accordance with the invention can be used in laying out lines and shapes of various kinds within extremely close tolerances.

To employ a simple illustration—when it is desired to lay out an equilateral triangle of a certain size on a piece of sheet material the angle plate 10 is placed on a flat surface plate and the material is clamped flatly against the face 14 of the indexing plate 11. The locking pin 23 is then inserted in two registering holes in the angle plate and the indexing plate—for example, in the outer hole 20 of the group A of stationary holes and in the first one of the outer holes 25 in the group E of movable holes. After the indexing plate has been locked in this manner a vernier height gauge of the type commonly used by toolmakers is placed on the surface plate in front of the piece of material, with its marking edge in engagement with the material at the desired height, and is moved horizontally to scribe a horizontal line on the material. Then the pin 23 is withdrawn; the released angle plate is turned in a clockwise direction through an angle of 60°; the pin is inserted in the outer hole 20 of the group B of stationary holes and in hole 28 of the outer row of movable holes in group E; the gauge is again placed on the surface plate with its marking edge in engagement with the material; and a second horizontal line scribed on the material, the second line of course being at an angle of exactly 60° to the first line. After this has been done the pin 23 is again removed; the angle plate is turned still farther in a clockwise direction through another angle of 60°; the pin is inserted in the outer hole 20 of the group C of stationary holes and in hole 29 of the outer row of movable holes in group E; the gauge is again placed on the surface plate with its marking edge in engagement with the material, with the edge intersecting the last scribed line at the desired distance from the intersection of the first and second lines; and another horizontal line is scribed on the material, the last line intersecting the first and second lines to complete the desired triangular design.

In laying out a circle of a certain radius on a piece of material, the height gauge is positioned with its marking edge in vertical alignment with the axis of the indexing plate and with such edge the distance of the desired radius above or below the axis (the exact height of such axis above the base of the angle plate having first been accurately determined) and the indexing plate is then rotated through 360° with the edge of the height gauge maintained continuously in engagement with the material, thereby scribing the desired circle on the material.

In the modified embodiment shown in Figs. 6 and 7 a compound indexing unit is shown in which the mounting portion 30 of the angle plate is hinged at 31 to the base portion 32. This permits the mounting portion 30 to be tilted into any desired position, between the vertical position shown in full lines and the horizontal position shown in dotted lines. The indexing plate 33, which is similar to the above described indexing plate 11, is journaled on the mounting portion 30 and is adapted to be locked with respect thereto in any desired position of angular adjustment.

The mounting portion 30 is provided at one side with a wing-like quadrant 34 which extends rearwardly into lapped engagement with a lug 35 on the base portion 32. The quadrant 34 is provided at F with ninety holes, which holes are arranged in three concentric rows of thirty holes each and extend over an arc of 90° about the axis 31 as a center. The lug 35 is provided with three holes 36, 37 and 38 which are located the same distance apart as the three concentric rows along a straight line passing through the axis 31. A pin 39 is adapted to be inserted through any one of the holes in the group F on the quadrant 34 and whichever one of the holes 36, 37 and 38 is located behind that hole, whereby to lock the mounting portion 30 in any desired position throughout an angle of 90°.

The mounting plate 30 may also be provided, at the other side of the same, with a similar quadrant 34'. In this quadrant the ninety holes are each offset one-half of a degree from the corresponding hole in the quadrant 34, whereby to permit the tilted position of the mounting portion 30 to be adjusted to one-half of a degree. In all other respects the quadrant 34', the lug 35' which it overlaps, the holes in the lug, and the locking pin 39' are the same.

In either of the two above described embodiments of the invention the pin 15 can be replaced by a work clamping collet 40, such as the one shown schematically in Fig. 8. This collet includes a constrictable inner portion 41 and an outer portion 42. Knurled heads 43 and 44 are attached to the portions 41 and 42. When one of the heads is turned relative to the other the inner portion 41 will be constricted to fixedly clamp an inserted stem portion of a piece of work in position for a marking or other operation.

An instrument constructed in accordance with the invention has an almost unlimited range of use. To mention but a few of the many diversified operations with which it can be employed—it can be used to lay out hexagons or triangles or any figure that will divide into 360°; to lay out lines at different angles to each other without unclamping the work; to accurately scribe circles; to lay out, locate and compute distances in angular measurements; to lay out, with the employment of the compound or tiltable indexing plate, three dimensional figures; to locate and drill holes in a circle at equal distances or at odd angles from each other, the indexing plate being suitably clamped in position during the drilling operation; to locate and drill holes in different planes; and to hold the work in any desired position while grinding, milling or otherwise operating on the same.

I claim:

1. An indexing unit, comprising an angle plate having a horizontal supporting base and a vertically extending portion, an indexing plate having a flat vertically disposed work-supporting face, said indexing plate being rotatably secured on a horizontal axis to the vertically extending portion of the angle plate for rotation in the plane of said work-supporting face, means for fixedly positioning a piece of work on said work-supporting face, said vertically extending portion of the angle plate being provided with stationary holes which are located equidistant from said axis and are spaced 90° apart, said indexing plate being provided with an arcuately arranged series of movable holes which are located the same distance from said axis and mark off equal subdivisions of 90°, and a pin which is adapted to enter one of the stationary holes and one of the movable holes upon the indexing plate being rotated to bring any desired movable hole into axial registration with that stationary hole.

2. An indexing unit, comprising an angle plate having a base portion and a mounting portion, an indexing plate having a flat vertically disposed work-supporting face, said indexing plate being rotatably secured on a horizontal axis to the mounting portion of the angle plate for rotation in the plane of said work-supporting face, means for fixedly positioning a piece of work against said work-supporting face, said mounting portion of the angle plate being provided with stationary holes which are located equidistant from said axis and are separated circumferentially from each other at regularly spaced intervals, said indexing plate being provided with an arcuately arranged series of movable holes which are located the same distance from said axis as said stationary holes and are distributed at regular intervals through an angle equal to the angle between any two of the stationary holes, and a pin which is adapted to enter one of the stationary holes and one of the movable holes upon the indexing plate being rotated to bring any desired movable hole into axial registration with that stationary hole, said stationary holes being separated 90° from each other, and said arcuately arranged series of movable holes being located within an arc of 90°, with each hole separated 1° from the next.

3. An indexing unit, comprising an angle plate having a base portion and a mounting portion, an indexing plate having a flat vertically disposed work-supporting face, said indexing plate being rotatably secured on a horizontal axis to the mounting portion of the angle plate for rotation in the plane of said work-supporting face, means for fixedly positioning a piece of work against said work-supporting face, said mounting portion of the angle plate being provided with stationary holes which are located equidistant from said axis and are separated circumferentially from each other at regularly spaced intervals, said indexing plate being provided with an arcuately arranged series of movable holes which are located the same distance from said axis as said stationary holes and are distributed at regular intervals through an angle equal to the angle between any two of the stationary holes, and a pin which is adapted to enter one of the stationary holes and one of the movable holes upon the indexing plate being rotated to bring any desired movable hole into axial registration with that stationary hole, the mounting portion of the angle plate being adjustably tiltable with respect to the base portion of the mounting plate and being lockable in any desired position of adjustment.

FRANCIS P. BAUM.